(12) United States Patent
Hyakudai et al.

(10) Patent No.: US 6,215,819 B1
(45) Date of Patent: Apr. 10, 2001

(54) RECEIVING APPARATUS AND RECEIVING METHOD

(75) Inventors: Toshihisa Hyakudai; Takahiro Okada, both of Chiba; Yasunari Ikeda, Kanagawa, all of (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/069,702

(22) Filed: Apr. 29, 1998

(30) Foreign Application Priority Data

May 2, 1997 (JP) .................................................. 9-114710

(51) Int. Cl.[7] ................................. H04B 1/66; H04N 7/12
(52) U.S. Cl. ............................................................. 375/240
(58) Field of Search ..................................... 348/390, 391, 348/392, 395, 403, 399, 410, 388, 408, 724, 726, 735, 611; 375/316, 326, 340, 344; 370/203, 206, 480; H04N 7/12; H04B 1/66

(56) References Cited

U.S. PATENT DOCUMENTS

| | | | |
|---|---|---|---|
| 5,313,169 | 5/1994 | Fouche et al. | 329/302 |
| 5,471,464 * | 11/1995 | Ikeda | 370/19 |
| 5,506,836 * | 4/1996 | Ikeda et al. | 370/19 |
| 5,771,224 * | 6/1998 | Seki et al. | 370/206 |
| 5,818,827 * | 10/1998 | Usui et al. | 370/344 |
| 5,825,807 * | 10/1998 | Kumar | 375/200 |
| 5,828,710 * | 10/1998 | Beale | 375/344 |
| 5,838,734 * | 11/1998 | Wright | 376/316 |
| 5,867,532 * | 2/1999 | Ito et al. | 375/265 |
| 5,878,089 * | 3/1999 | Dapper et al. | 375/325 |
| 5,889,759 * | 3/1999 | MacGibney | 370/207 |
| 5,920,598 * | 7/1999 | Hyakyakudai et al. | 375/316 |
| 5,946,293 * | 8/1999 | Beale et al. | 370/210 |
| 5,959,965 * | 9/1999 | Ohkubo et al. | 370/203 |

FOREIGN PATENT DOCUMENTS

| | | |
|---|---|---|
| WO 92/10043 | 6/1992 | (WO) . |
| WO 95/19671 | 7/1995 | (WO) . |
| WO 95/20848 | 8/1995 | (WO) . |

* cited by examiner

Primary Examiner—Chris Kelley
Assistant Examiner—Tung T Vo
(74) Attorney, Agent, or Firm—Lerner, David, Littenberg, Krumholz & Mentlik, LLP

(57) ABSTRACT

An apparatus and method for receiving an OFDM signal arranged to accurately reproduce a clock signal. I channel data and Q channel data are differential-demodulated by a differential demodulation circuit and are supplied to a ROM. The ROM reads out an intersymbol phase change amount corresponding to the differential-demodulated data and supplies it to a gate circuit. The gate circuit extracts only a component corresponding to each of pilot signals in the input data, and supplies the extracted component to a sign inversion circuit and to a selector. The selector selects the output from the gate circuit if the pilot signal is a positive frequency value or the output from the sign inversion circuit if the pilot signal is a negative frequency value, and supplies the obtained value to a cumulative addition circuit. The cumulative addition circuit performs cumulative addition of values output from the selector over a symbol period, and outputs the addition result to an average circuit. The average circuit averages the output from the cumulative addition circuit and controls the frequency of oscillation of a clock signal according to a value obtained by the average circuit.

9 Claims, 12 Drawing Sheets

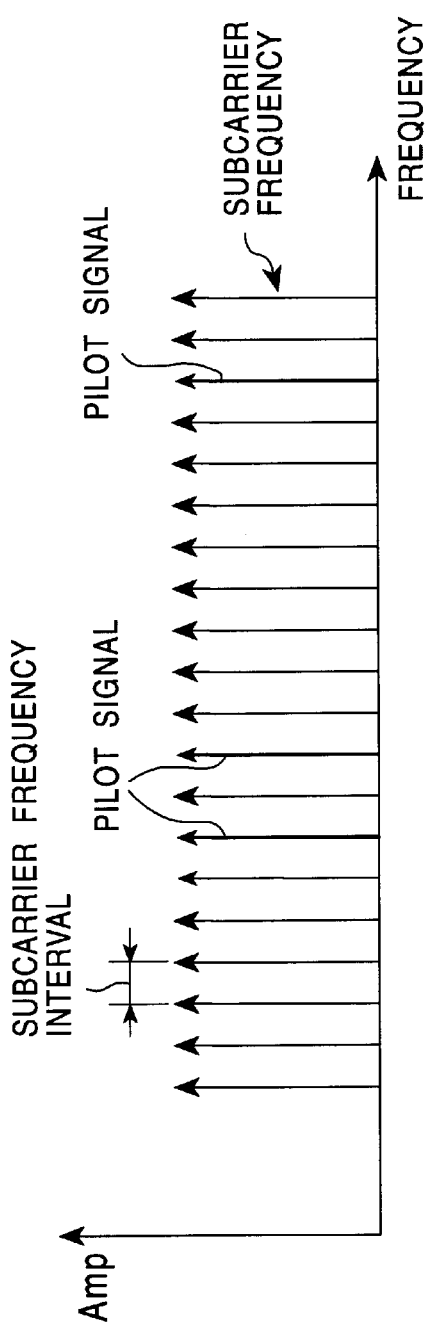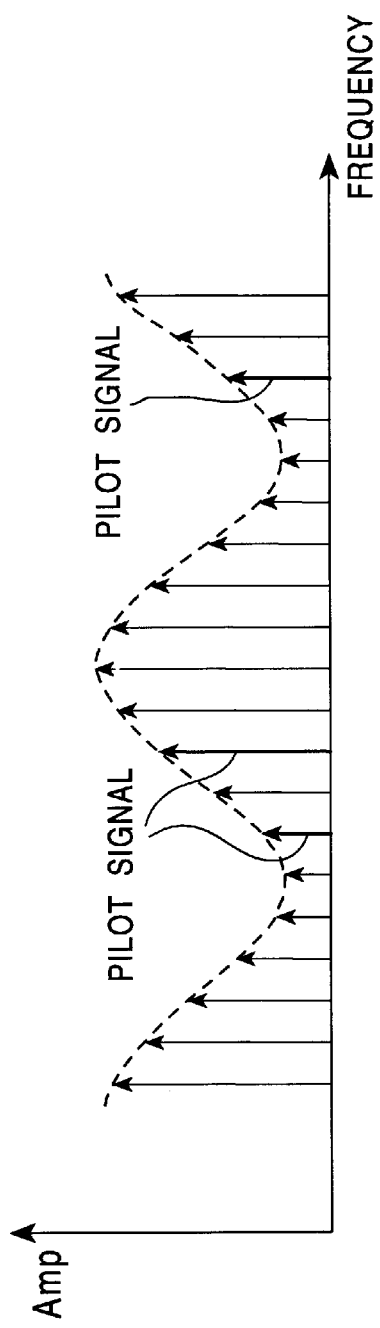
FIG. 12A
FIG. 12B

RECEIVING APPARATUS AND RECEIVING METHOD

BACKGROUND OF THE INVENTION

1. Field of the Invention

The present invention relates to a receiving apparatus and a receiving method and, more particularly, to a receiving apparatus and a receiving method based on an OFDM method.

2. Description of the Related Art

Modulation methods called orthogonal frequency division multiplexing (OFDM) have recently been proposed as a method for transmitting a digital signal. In an OFDM method, a number of subcarriers orthogonal to each other are provided in a transmission band, data items are respectively assigned to the amplitudes and phases of the subcarriers, and digital modulation is performed by phase shift keying (PSK) or quadrature amplitude modulation (QAM). This method uses a reduced band for one subcarrier since the transmission band is divided with respect to a number of subcarriers, so that the modulation speed is reduced. This method, however, achieves the same total transmission speed as other conventional modulation methods because the number of carriers is large.

In this OFDM method, the symbol speed is reduced since a number of subcarriers are transmitted parallel to each other, so that a multipath period relative to the length of a symbol with respect to time can be reduced. Thus, an OFDM method can be expected as a method ensuring high resistance to multipath interference.

Because of the above-described feature, OFDM methods have attracted attention particularly with respect to transmission of digital ground wave signals susceptible to the influence of multipath interference. For example, Digital Video Broadcasting-Terrestrial (DVB-T) is well known as such digital signal transmission by ground waves.

With the recent progress of the semiconductor technology, it has become possible to achieve discrete Fourier transform (hereinafter referred to as FFT (fast Fourier transform)) and discrete inverse Fourier transform (hereinafter referred to as IFFT (inverse fast Fourier transform)) by hardware. If these transforms are used, modulation and demodulation in accordance with an OFDM method can easily be performed. This has also contributed to the increase of attention to OFDM methods.

FIG. 10 is a block diagram showing the configuration of an example of an OFDM receiver. A receiving antenna 101 captures an RF signal. A multiplication circuit 102 calculates the product of the RF signal and a signal which is output from a tuner 103 and which has a predetermined frequency. A bandpass filter 104 extracts the desired IF signal from an output from the multiplication circuit 102. An A/D (analog to digital) conversion circuit 105 converts the IF signal extracted by the bandpass filter 104 into a digital signal.

A demultiplexer 106 separates and extracts an I channel signal and a Q channel signal from the digitized IF signal. Lowpass filters 107 and 108 respectively convert the I channel signal and the Q channel signal into baseband signals by removing unnecessary high-frequency components contained in the I channel signal and the Q channel signal.

A complex multiplication circuit 109 removes a carrier frequency error in the baseband signals by a signal of a predetermined frequency supplied from a numerical control oscillation circuit 110, and thereafter supplies the baseband signals to a fast Fourier transform circuit 112, which frequency-decomposes the OFDM time signals to form I and Q channel received data.

A correlation value calculation circuit 113 calculates a shift average of guard intervals by calculating the product of the OFDM time signal converted into the base band and the OFDM signal delayed by the effective symbol period to obtain a correlation value of the two signals, and makes the fast Fourier transform circuit 112 start calculating when the correlation value becomes maximized.

A carrier frequency error calculation circuit 114 calculates a carrier frequency error by detecting a frequency power deviation and outputs the calculation result to an addition circuit 111. The addition circuit 111 calculates the sum of the outputs from the carrier frequency error calculation circuit 114 and the correlation value calculation circuit 113 and outputs the calculation result to the numerical control oscillation circuit 110.

A clock frequency reproduction circuit 115 forms a control signal by referring to the I channel data and Q channel data to control the frequency of oscillation of the clock oscillation circuit 116. The clock oscillation circuit 116 forms and outputs a clock signal in accordance with the control signal supplied from the clock frequency reproduction circuit 115.

The operation of the above-described example of the conventional apparatus will next be described.

The multiplication circuit 102 calculates the product of an RF signal captured by the receiving antenna 101 and the signal supplied from the tuner 103 and having a predetermined frequency. The bandpass filter 104 extracts the IF signal from the signal output from the multiplication circuit 102.

The A/D conversion circuit 105 converts the IF signal output from the bandpass filter 104 into a digital signal in synchronization with the clock signal output from the clock oscillation circuit 116, and supplies the digital signal to the demultiplexer 106. The demultiplexer 106 separates and extracts an I channel signal and a Q channel signal from the digitized signal and supplies these signals to the lowpass filters 107 and 108. The lowpass filters 107 and 108 respectively convert the I channel signal and the Q channel signal into baseband signals by removing aliasing components which are unnecessary high-frequency components contained in the I channel signal and the Q channel signal.

The complex multiplication circuit 109 removes a carrier frequency error in the baseband signals by a signal of a predetermined frequency supplied from the numerical control oscillation circuit 110, and thereafter supplies the baseband signals to the fast Fourier transform circuit 112. The fast Fourier transform circuit 112 frequency-decomposes the OFDM time signal to form I and Q channel received data.

The correlation value calculation circuit 113 calculates a value representing a correlation between the OFDM time signal converted into the base band and the OFDM signal delayed by the effective symbol period and makes the fast Fourier transform circuit 112 start calculating when the correlation value becomes maximized. Consequently, the fast Fourier transform circuit 112 can accurately extract data contained in the I channel signal and Q channel signal sent from the transmitting side.

There are various synchronization requirements for correctly demodulating the OFDM signal on the receiving side. For example, it is necessary to synchronize the frequency of oscillation in the numerical control oscillation circuit 110 with the corresponding frequency on the transmitting side in order to convert the OFDM signal in the IF band into the OFDM signal in the base band. It is also necessary to synchronize the clock signal, which is a reference for all the processings, with that on the transmitting side.

A clock reproduction method already proposed, which is used as a method for the latter synchronization of the clock signal with that on the transmitting side, will now be described.

According to the method described below, on the transmitting side, a predetermined number of particular signals prescribed in amplitude and phase (hereinafter referred to as pilot signals other than information to be transmitted are inserted and transmitted with respect to each of symbols. On the receiving side, pilot signals inserted on the transmitting side are extracted from the OFDM signal processed by FFT calculation, and the extracted pilot signals are processed by Costas calculation or the like described below to reproduce the clock signal.

FIG. 11 shows the configuration of a conventional clock reproduction circuit for reproducing a clock signal by using Costas calculation in the case where pilot signals are modulated by QPSK (quadrature phase shift keying). Gate circuits 208-1 and 208-2 shown in FIG. 11 are supplied with I channel data and Q channel data processed by FFT calculation, extract only pilot signals from the I and Q channel data and output the pilot signals. Squaring circuits 203-1 and 203-2 respectively square the pilot signals extracted by the gate circuits 208-1 and 208-2 and output the squared signals. A multiplication circuit 205 calculates the product of the pilot signals extracted by the gate circuits 208-1 and 208-2 and outputs the product.

A subtraction circuit 206 subtracts the output of the squaring circuit 203-2 from the output of the squaring circuit 203-1 and outputs the subtraction result. A multiplication circuit 207 calculates the product of the output of the multiplication circuit 205 and the output of the subtraction circuit 206 and outputs the product. An LPF 209 removes unnecessary high-frequency components from the output of the multiplication circuit 207 and outputs the processing result.

The operation of the above-described conventional circuit will next be described.

I channel data and Q channel data demodulated by being frequency-decomposed by the fast Fourier transform circuit 112 shown in FIG. 10 are respectively input to the gate circuits 208-1 and 208-2 in the order from the lowest to the highest of their lower frequencies. The gate circuits 208-1 and 208-2 respectively extract only pilot signals from the I channel data and Q channel data and supply the extracted pilot signals to the squaring circuits 203-1 and 203-2 and to the multiplication circuit 205.

The multiplication circuit 205 calculates the product of the pilot signals extracted by the gate circuits 208-1 and 208-2 and outputs the product to the multiplication circuit 207. The squaring circuits 203-1 and 203-2 respectively square the pilot signals extracted by the gate circuits 208-1 and 208-2 and output the squared pilot signals to the subtraction circuit 206.

The subtraction circuit 206 subtracts the output of the squaring circuit 203-2 from the output of the squaring circuit 203-1 and outputs the subtraction result to the multiplication circuit 207. The multiplication circuit 207 calculates the product of the output of the multiplication circuit 205 and the output of the subtraction circuit 206 and outputs the product. The LPF 209 removes unnecessary high-frequency components from the output of the multiplication circuit 207 and outputs the processing result.

The above-described sequence of operations is so-called Costas calculation, whereby a phase error in the clock signal can be detected. The clock oscillation circuit 116 is controlled by referring to a phase error in the clock signal detected in the above-described manner, thereby forming the clock signal with accuracy.

In the case where a phase error is detected by using Costas calculation such as described above and a clock signal is reproduced according to the result of Costas calculation, the detected phase error contains, as well as a phase error accompanying a clock frequency error, a reproducing carrier phase error, an FFT window phase error, a phase error due to Gaussian noise, and a phase error due to a multipath transmission channel distortion unavoidable in transmission of ground waves. It is, therefore, difficult to control the clock oscillation circuit by extracting only a phase error accompanying only a reproducing clock error.

FIG. 12A shows an example of a spectrum of an OFDM signal, and FIG. 12B shows a spectrum of the OFDM signal when the signal is undergoing multipath interference. In these diagrams, thick lines represent pilot signals inserted on the transmitting side. If, as shown in FIG. 12B, a transmitted signal undergoes frequency-selective multipath interference, the signal-to-noise ratio of the pilot signals is reduced relative to that of the other subcarriers. In such a situation, the signal-to-noise ratio of the phase error signal of the clock signal formed from the pilot signals by the above-described method is also reduced. Thus, if the transmitted signal undergoes multipath interference, it is difficult to accurately reproduce the clock signal.

SUMMARY OF THE INVENTION

In view of the above-described circumstances, an object of the present invention is to provide a clock reproduction circuit for an OFDM receiving apparatus capable of accurately reproducing a clock signal even if a received OFDM signal contains, as well as a phase error accompanying a clock frequency error, a reproducing carrier phase error, an FFT window phase error, a phase error due to Gaussian noise and a phase error due to a multipath transmission channel distortion.

To achieve the above-described object, according to a first aspect of the present invention, there is provided a receiving apparatus comprising conversion means for performing discrete Fourier transform of an OFDM signal, storage means for storing a frequency component of a subcarrier obtained by the conversion means, computation means for computing an amount of phase change between the frequency component stored in the storage means at least one symbol before and a frequency component newly obtained by the conversion means, extraction means for extracting a component corresponding to a series of pilot signals from the amount of phase change computed by the computation means, and control means for controlling the frequency of a clock signal according to the amount of phase change extracted by the extraction means and corresponding to the series of pilot signals.

According to a second aspect of the present invention, there is provided a receiving method comprising a conversion step of performing discrete Fourier transform of an OFDM signal, a storage step of storing a frequency component of a subcarrier obtained in the conversion step, a computation step of computing an amount of phase change between the frequency component stored in the storage step at least one symbol before and a frequency component newly obtained in the conversion step, an extraction step of extracting a component corresponding to a series of pilot signals from the amount of phase change computed in the computation step, and a control step of controlling the frequency of a clock signal according to the amount of phase change extracted in the extraction step and corresponding to the series of pilot signals.

According to a third aspect of the present invention, there is provided a receiving apparatus comprising delay means for delaying, by an effective symbol period, an OFDM time signal converted into a base band, calculation means for calculating a value representing a correlation between the OFDM time signal delayed by the delay means and the undelayed OFDM time signal, detection means for detecting a maximum of the correlation value obtained by the calculation means, hold means for holding a phase of a maximum at a certain time detected by the detection means, estimation means for estimating a phase shift between the phase held by the hold means and the phase of a maximum newly detected by the detection means, and control means for controlling the frequency of a clock signal according to the phase shift estimated by the estimation means.

According to a fourth aspect of the present invention, here is provided a receiving method comprising a delay step of delaying, by an effective symbol period, the OFDM time signal converted into a base band, a calculation step of calculating a value representing a correlation between the OFDM time signal delayed in the delay step and the undelayed OFDM time signal, a detection step of detecting a maximum of the correlation value obtained in the calculation step, a hold step of holding a phase of a maximum at a certain time detected in the detection step, an estimation step of estimating a phase shift between the phase held in the hold step and the phase of a maximum newly detected in the detection step; and a control step of controlling the frequency of a clock signal according to the phase shift estimated in the estimation step.

In the receiving apparatus according to the first aspect of the present invention, the conversion means performs discrete Fourier transform of an OFDM signal; the storage means stores a frequency component of a subcarrier obtained by the conversion means; the computation means computes an amount of phase change between the frequency component stored in the storage means at least one symbol before and a frequency component newly obtained by the conversion means; the extraction means extracts a component corresponding to a series of pilot signals from the amount of phase change computed by the computation means; and the control means controls the frequency of a clock signal according to the amount of phase change extracted by the extraction means and corresponding to the series of pilot signals. For example, an FFT conversion circuit corresponding to the conversion means performs discrete Fourier transform of an OFDM signal; a memory corresponding to the storage means stores a subcarrier frequency component thereby obtained; the computation means differential-demodulates the frequency component stored in memory one symbol before and a frequency component newly output from the FFT conversion circuit to compute an amount of phase change; the extraction means extracts a component corresponding to a series of pilot signals from the amount of phase change computed by the computation means; and the control means controls the frequency of a clock signal according to the amount of phase change of the series of pilot signals extracted by the extraction means.

In the receiving method according to the second aspect of the present invention, discrete Fourier transform of an OFDM signal is performed in the conversion step; a frequency component of a subcarrier obtained in the conversion step is stored in the storage step; an amount of phase change between the frequency component stored in the storage step at least one symbol before and a frequency component newly obtained in the conversion step is computed in the computation step; a component corresponding to a series of pilot signals is extracted in the extraction step from the amount of phase change computed in the computation step; and the frequency of a clock signal is controlled in the control step according to the amount of phase change extracted in the extraction step and corresponding to the series of pilot signals. For example, in the conversion step, an FFT circuit performs discrete Fourier transform of an OFDM signal; in the storage step, a memory stores a subcarrier frequency component thereby obtained; in the computation step, the frequency component stored in the storage step at least one symbol before and a frequency component newly output from the FFT conversion circuit is differential-demodulated to obtain an amount of phase change; in the extraction step, a component corresponding to a series of pilot signals is extracted from the amount of phase change computed in the computation step; and, in the control step, the frequency of a clock signal is controlled according to the amount of phase change of the series of pilot signals extracted in the extraction step.

In the receiving apparatus according to the third embodiment of the present invention, the delay means delays, by an effective symbol period, an OFDM time signal converted into a base band; the calculation means calculates a value representing a correlation between the OFDM time signal delayed by the delay means and the undelayed OFDM time signal; the detection means detects a maximum of the correlation value obtained by the calculation means; the hold means holds a phase of a maximum at a certain time detected by the detection means; the estimation means estimates a phase shift between the phase held by the hold means and the phase of a maximum newly detected by the detection means; and the control means controls the frequency of a clock signal according to the phase shift estimated by the estimation means. For example, a memory corresponding to the delay means delays, by an effective symbol period, an OFDM time signal converted into a base band; the calculation means calculates, over a guard period, a value representing a correlation between the OFDM time signal delayed by the delay means and the undelayed OFDM time signal; the detection means detects a maximum of the correlation value obtained by the calculation means; a memory corresponding to the hold means holds a phase of a maximum at a certain time detected by the detection means; the estimation means estimates a phase shift between the phase held by the hold means and the phase of a maximum newly detected by the detection means; and the control means controls the frequency of a clock signal according to the phase shift estimated by the estimation means.

In the receiving method according to the fourth aspect of the present invention, an OFDM time signal converted into a base band is delayed by an effective symbol period in the delay step; a value representing a correlation between the OFDM time signal delayed in the delay step and the undelayed OFDM time signal is calculated in the calculation step; a maximum of the correlation value obtained in the calculation step is detected in the detection step; a phase of a maximum at a certain time detected in the detection step is held in the hold step; a phase shift between the phase held in the hold step and the phase of a maximum newly detected in the detection step is estimated in the estimation step; and the frequency of a clock signal is controlled in the control step according to the phase shift estimated in the estimation step. For example, in the delay step, a memory delays, by an effective symbol period, an OFDM time signal converted into a base band; in the calculation step, a value representing a correlation between the OFDM time signal delayed in the delay step and the undelayed OFDM time signal is calculated over a guard period; in the detection step, a maximum of the correlation value obtained in the calculation step is detected; in the hold step, a memory holds a phase of a maximum at a certain time detected in the detection step; in the estimation step, a phase shift between the phase held in the hold step and the phase of a maximum newly detected in the detection step is estimated; and, in the control step, the frequency of a clock signal is controlled according to the phase shift estimated in the estimation step.

BRIEF DESCRIPTION OF THE DRAWINGS

FIG. 12 is a diagram showing an OFDM received spectrum influenced by multipath interference.

DESCRIPTION OF THE PREFERRED EMBODIMENTS

Figure 1:
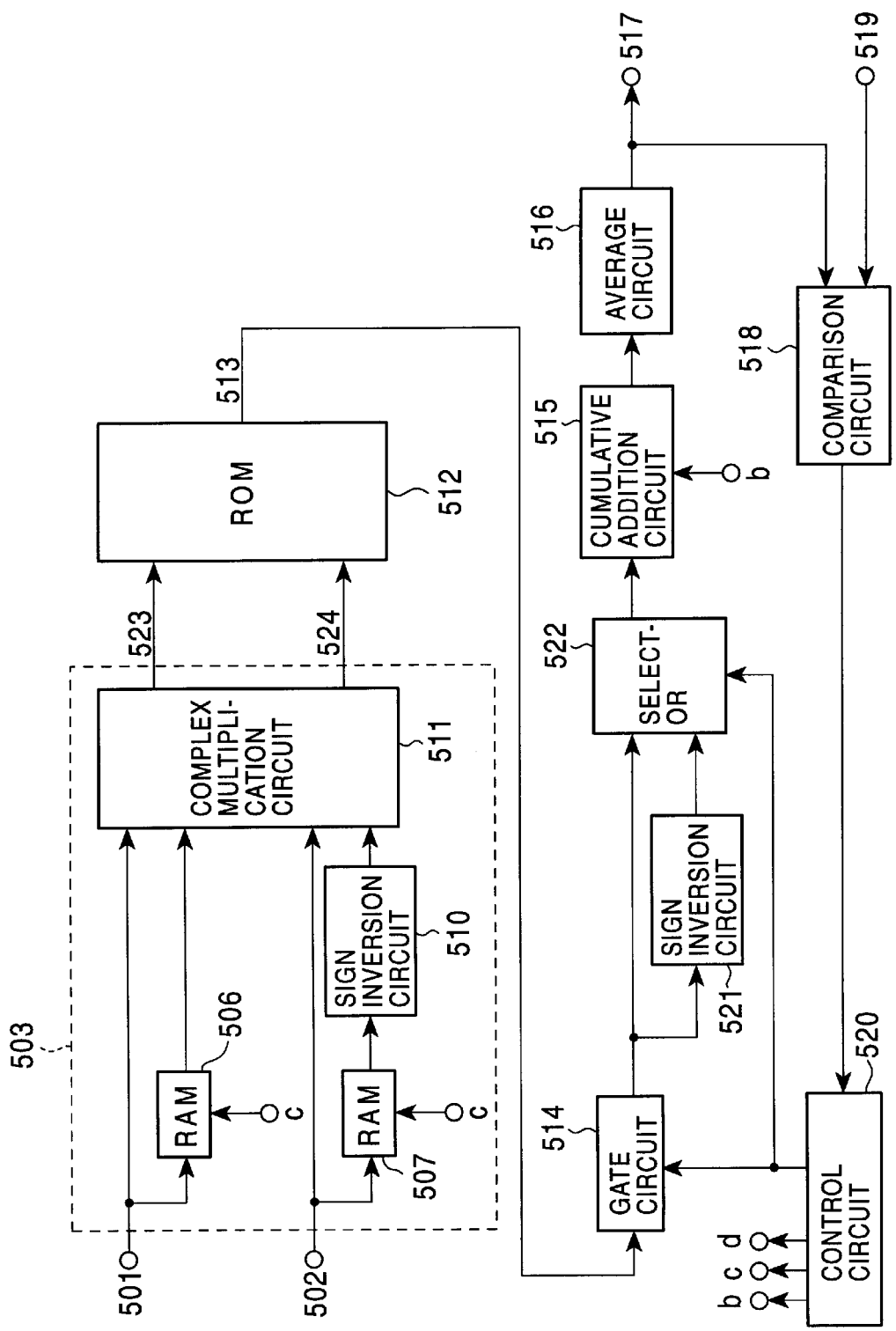
FIG. 1 is a block diagram showing the configuration of a first embodiment of the present invention.
Figure 10:
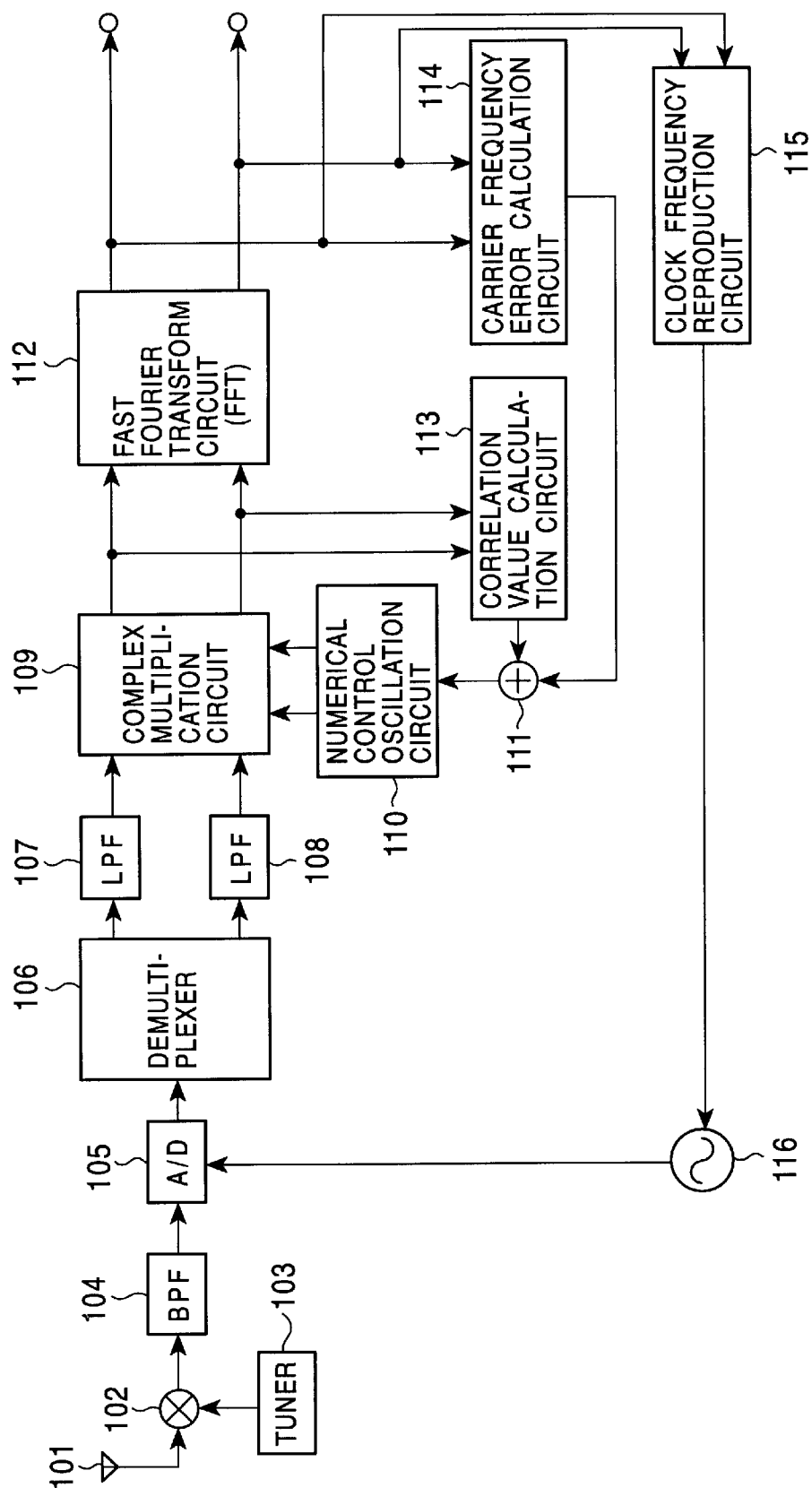
FIG. 10 is a block diagram showing the configuration of an OFDM receiver.
Figure 11:
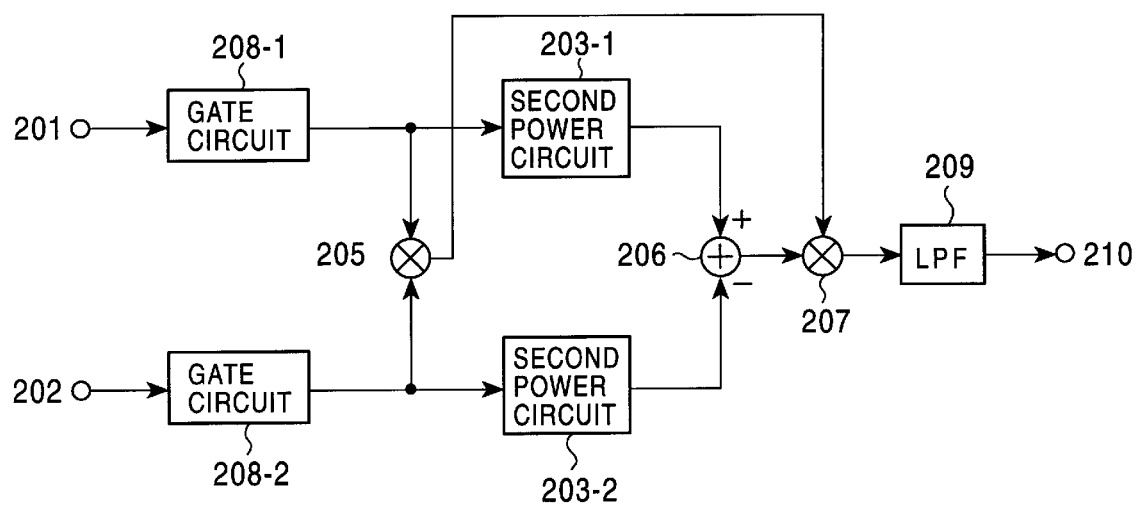
FIG. 11 is a block diagram showing the configuration of a conventional clock reproduction apparatus using Costas calculation.

FIG. 1 shows an embodiment of the present invention. This embodiment relates to the clock frequency reproduction circuit 115 shown in FIG. 10.

Referring to FIG. 1, a differential demodulation circuit 503 is formed of random access memories (RAMs) 506 and 507, a sign inversion circuit 510, and a complex multiplication circuit 511, and is arranged to differential-demodulate input I channel and Q channel data. Each of the RAMs 506 and 507 is arranged to store each of units of input I channel data or Q channel data corresponding to symbols in accordance with a control signal c from a control circuit 520, and to output each unit data with a delay corresponding to one symbol period. The sign inversion circuit 510 is arranged to invert the sign of output data from the RAM 507 and to output the sign-inverted data.

The complex multiplication circuit 511 is arranged to perform complex calculation represented by an expression below, wherein I and Q respectively represent undelayed I channel and Q channel data, and $I^{-1}$ and $Q^{-1}$ respectively represent delayed I channel and Q channel data, and to output the calculation result by separating it into a real component 523 and an imaginary component 524. The symbol j represents the pure imaginary number.

$$(I+jQ)(I^{-1}-jQ^{-1}) \tag{1}$$

A ROM (read only memory) 512 has arc tangent (inverse tangent function) data stored therein and is arranged to output phase change amount data 513 corresponding to input I channel and Q channel data.

A gate circuit 514 is arranged to select, in accordance with a control signal of a control circuit 520, only a component corresponding to each of pilot signals prescribed on the transmitting side from phase change amount data 513 output from the ROM 512, and to supply the selected component to a sign inversion circuit 521 and to a selector 522. The sign inversion circuit 521 is arranged to invert the sign of the input phase change amount data and to output the sign-inverted data to the selector 522.

The selector 522 is controlled by the control circuit 520, and is arranged to select a phase change amount directly input from the gate circuit 514 if the input pilot signal is a positive frequency value or a phase change amount input from the sign inversion circuit 521 if the input pilot signal is a negative frequency value, and to supply the selected phase change amount to a cumulative addition circuit 515.

The cumulative addition circuit 515 is arranged to perform cumulative addition of phase error amounts of pilot signals output from the selector 522 after being initialized by a control signal b supplied from the control circuit 520 immediately before each symbol is input.

An average circuit 516 is arranged to average, over several symbols, the amount of accumulated phase errors output with respect to symbols to remove Gaussian noise contained in the amount of phase errors, and to thereafter calculate a phase error amount 517 for controlling a clock oscillation circuit 116.

A comparison circuit 518 is arranged to detect completion of determination (lock-in) of the frequency of a clock signal and to send corresponding information to the control circuit 520. That is, the comparison circuit 518 compares the value 519 corresponding to the case where intersymbol-differential-modulated data is zero and the current value of phase error amount 517, and outputs a predetermined control signal to the control circuit 520 if it determines that these value are equal to each other.

The operation of this embodiment will next be described, and the principle of the operation will first be described briefly.

For example, if reproduction processing of an OFDM signal is performed on the receiver side by using a clock signal not synchronized with that on the transmitting side, pilot signals demodulated by FFT processing contain a phase error due to failure of synchronization of the clock signal as well as an FFT window phase error, a reproducing carrier phase error, a phase error due to Gaussian noise, and a phase error due to a channel distortion such as multipath transmission interference or the like, which are commonly contained.

Phase errors other than those due to Gaussian noise and failure of clock signal synchronization are constant independent of symbols. Therefore, such phase errors (phase errors constant independent of symbols) can be removed by performing differential demodulation between symbols of a signal at a certain reference time and a currently observed signal. This can be expressed by the following equations:

$$\theta_{nk} = \theta_k + \phi + nk\delta + k(1+\delta)\tau + \psi_k + \epsilon_n \quad (2)$$

$$\theta_{(n+1)k} = \theta_k + \phi + (n+1)k\epsilon + k(1+\delta)\tau + \psi_k + \epsilon_{n+1} \quad (3)$$

$$\theta_{(n+1)k} - \theta_{nk} = k\delta + \epsilon_{n+1} + \epsilon_n \quad (4)$$

Equation (2) represents phase data of the kth subcarrier frequency of the nth symbol. $\theta_k$ represents a phase prescribed on the transmitting side; $\delta$, a clock error; $\phi$, a phase error of the reproducing carrier; $\tau$, an FFT window phase error; $\psi_k$, a phase error due to a transmission channel distortion such as multipath interference to the kth subcarrier frequency; $\epsilon_n$, a phase error of the nth symbol due to Gaussian noise. Equation (3) represents phase data of the kth subcarrier frequency of the (n+1)th symbol. Equation (4) is the result of subtracting Equation (2) from Equation (3), and represents the amount of phase change in the kth subcarrier frequency between the (n+1)th symbol and the nth symbol of the kth subcarrier frequency.

Figure 2:
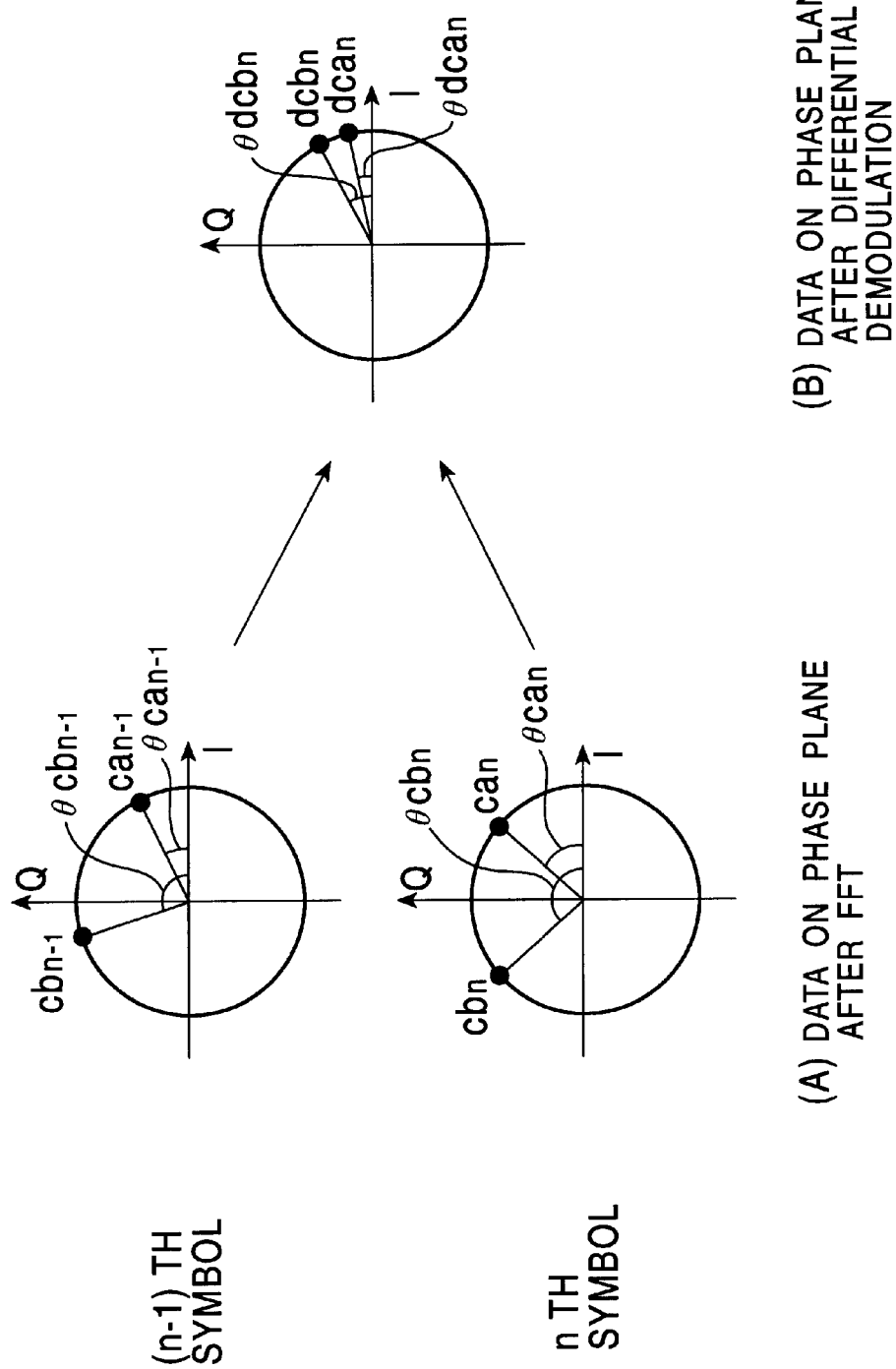
FIG. 2 is a diagram in which pilot signals before and after differential demodulation are shown on a phase plane.

FIG. 2 illustrates the above-described relation. In (2) of FIG. 2, each of ca$_{n-1}$, cb$_{n-1}$, ca$_n$, and Cb$_n$ denotes a pilot signal of a frequency a or b in the (n−1)th or nth symbol shown on a phase plane, and each of $\theta$ca$_{n-1}$, Ocb$_{n-1}$, $\theta$ca$_n$, and $\theta$cb$_n$ denotes the phase amount of the signal. Naturally, the frequencies of the pilot signals contained in the (n−1)th and nth symbols are to equal each other. However, a shift can occur between their points on the phase plane due to various errors such as those described above, as shown in (A) of FIG. 2. If differential demodulation is performed between the (n−1)th and nth symbols, errors which are constant independent of symbols (an FFT window phase error, a reproducing carrier phase error, a phase error due to a channel distortion such as multipath transmission interference or the like, etc.) can be removed.

That is, as shown in (B) of FIG. 2, the result of differential demodulation between the (n−1)th and nth symbols is such that the two pilot signals are moved to the vicinity of the I-axis. In (2) of FIG. 2, dca$_n$ and dcb$_n$ represent data of the pilot signals of frequencies a and b on the phase plane after intersymbol differential modulation, and d$\theta$ca$_n$ and d$\theta$cb$_n$ represent the phase amounts of the signals, which correspond to phase amounts due to a clock frequency error and an error due to Gaussian noise.

Thus, it is possible to remove errors due to factors other than a clock frequency error and Gaussian noise by performing differential demodulation between symbols. Removal of errors due to Gaussian noise will next be described.

Since errors due to Gaussian noise occur at random, they can be removed by a filtering (smoothing) effect based on cumulative addition of phase errors obtained from a plurality of pilot signals. As a result, an amount of phase error proportional to a clock frequency error can be obtained. A clock signal can be formed by accurately controlling the clock oscillation circuit 116 by using the thus-obtained phase error amount.

The above-described control is performed in a digital manner (by using discrete numerical values). Therefore, if the amount of phase change between adjacent two symbols becomes smaller than the resolution, it is impossible to continue the control. In this embodiment of the present invention, if the amount of phase change between adjacent two symbols becomes smaller than the resolution, the signal at the corresponding time after FFT processing is stored in a memory, and differential demodulation is performed between the stored data and new data to detect a clock phase error with a time spacing longer than the symbol period. That is, since such an error (quantization error) is accumulated with elapse of time, it can be detected by increasing the time period between comparison objects.

The operation of the embodiment shown in FIG. 1 will further be described.

I channel data 501 and Q channel data 502 decomposed with respect to the subcarrier frequencies by the fast Fourier transform circuit 112 are input to the differential demodulation circuit 503.

At an initial stage of clock reproduction, the differential demodulation circuit 503 successively supplies the I channel data and Q channel data to the RAMs 506 and 507 and to the complex calculation circuit 511 in the order from the lowest to the highest of the frequencies of the data.

The RAMs 506 and 507 respectively store the I channel data and the Q channel data with respect to symbols by control signal c from the control circuit 520 and output the data with a delay corresponding to one symbol period. The sign inversion circuit 510 inverts the sign of the Q channel data output from the RAM 507 and outputs the sign-inverted data. The I channel data, the I channel data one-symbol delayed, the Q channel data, and the Q channel data sign-inverted and one-symbol delayed undergo complex multiplcation shown by equation (1) in the order from the lowest to the highest of their frequencies to be output as I channel data 523 and Q channel data 524. This sequence of operations is intersymbol differential demodulation processing.

As described above, an FFT window error, a reproducing carrier phase error, etc., contained in the signal, are removed by this sequence of operations (differential demodulation).

Differential-demodulated data 523 and 524 are supplied in sequence to the ROM 512, and intersymbol phase change amounts 513 corresponding to the values of these data are read out and supplied to the gate circuit 514.

The gate circuit 514 selects and outputs, according to control by the control circuit 520, only a component corresponding to each of pilot signals from the intersymbol phase change amount data 513 output from the ROM 512.

Figure 3:
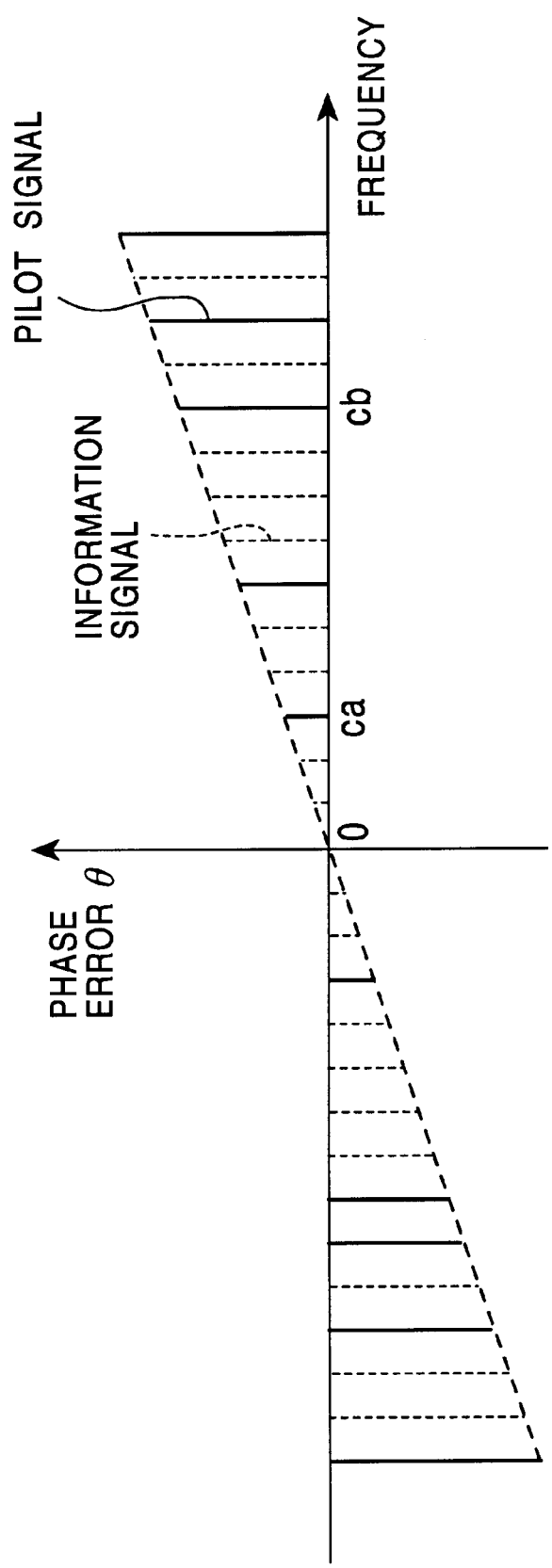
FIG. 3 is a diagram showing the relationship between a phase error due to a clock frequency error and subcarrier frequencies.

The sign inversion circuit 521 inverts the sign of the pilot signal extracted by the gate circuit 514 and supplies the sign-inverted signal to the selector 522. The selector 522 is controlled by the control circuit 520 and selects the phase change amount directly input from the gate circuit 514 if the input pilot signal is a positive frequency value or the phase change amount input from the sign inversion circuit 521 if the input pilot signal is a negative frequency value, and supplies the selected phase change amount to the cumulative addition circuit 515. Directions of phase change rotation of a clock frequency error, such as shown in FIG. 3, dependent on the plus and minus of frequency values, can be uniformized by this operation.

The cumulative addition circuit 515 is initialized by control signal b supplied from the control circuit 520 immediately before a new symbol is input. Then, the cumulative addition circuit 515 performs cumulative addition of the phase error amounts of the pilot signals output from the selector 522. The average circuit 516 averages, over several symbols, the amount of accumulated phase errors output with respect to the symbols to remove Gaussian noise components contained in the amount of phase errors, as described above, and produces phase error amount 517 for controlling the clock oscillation circuit 116. Phase error amount 517 output from the average circuit 516 is supplied to the clock oscillation circuit 116 to control the frequency of oscillation of the same. By this sequence of operations, a correct clock frequency is reproduced.

Figure 4:
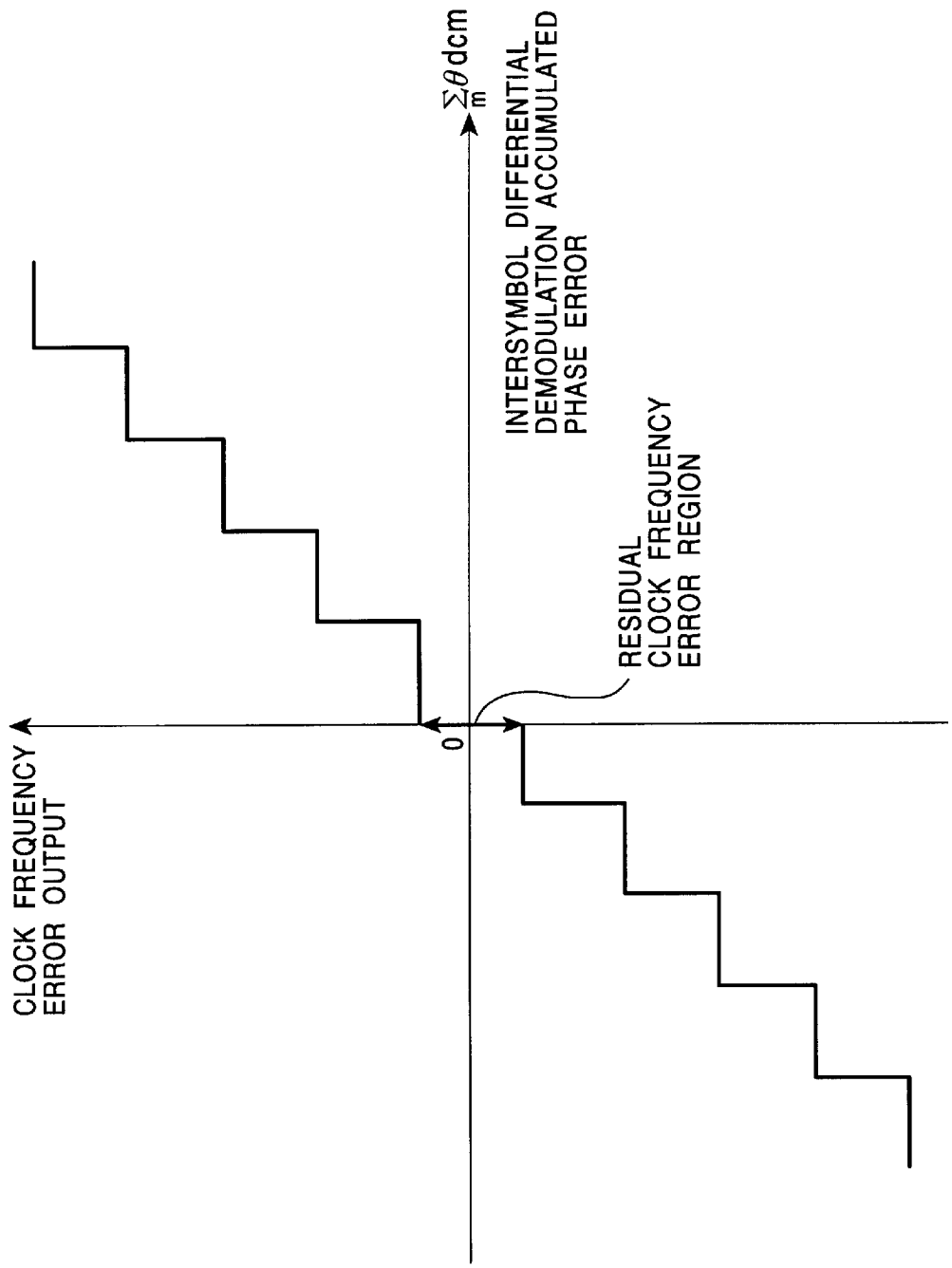
FIG. 4 is a diagram showing a residual clock frequency error region.

When the clock frequency determination processing performed as described above is completed, phase error amount 517 obtained by intersymbol differential demodulation becomes smaller than the resolution and enters a residual clock frequency error region shown in FIG. 4. That is, since an error in the clock frequency is output as a discrete value, there is a possibility of the clock frequency output not being zero even when the intersymbol differential demodulation accumulated phase error is zero. In such a case, it is impossible to continue accurate control of the clock signal.

Figure 5:
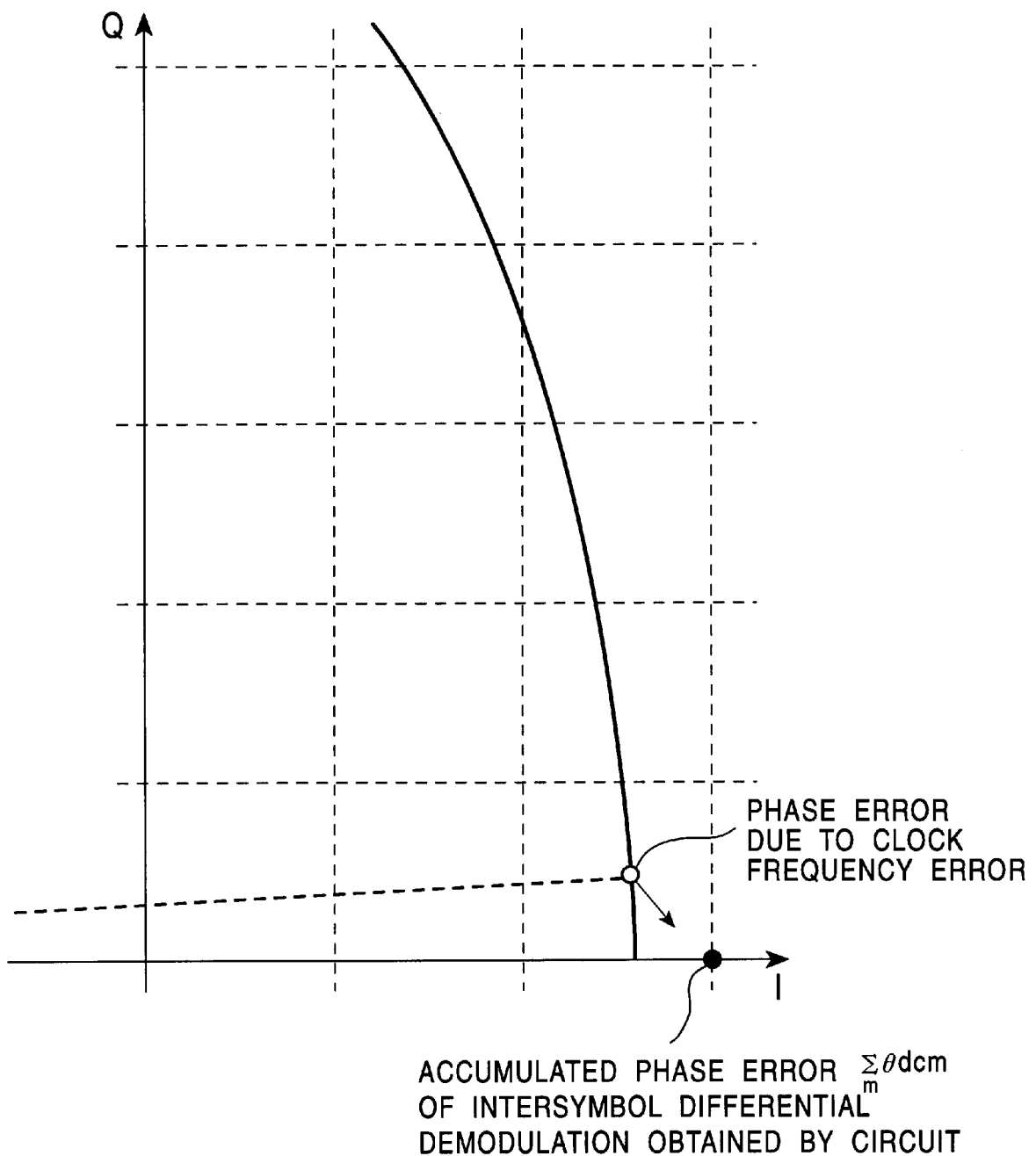
FIG. 5 is a diagram in which the residual clock frequency error region is shown on a phase plane.

In FIG. 5, the residual clock frequency error region shown in FIG. 4 is indicated on the phase plane. In FIG. 5, the coordinate represents Q signal while the abscissa represents I signal, and grid lines correspond to quantization steps. If a pilot signal represented by the white round mark in FIG. 5 is input to be identified with respect to the grid lines, it is identified as data at the position indicated by the black round mark in FIG. 5. In such a case, the phase error due to the clock frequency error is ignored, so that the control is not executed with respect to the error.

In this embodiment, however, if the comparison circuit 518 detects convergence of the output from the average circuit 516, it outputs a control signal to the control circuit 520 to fix the values in the RAMS 506 and 507.

That is, the comparison circuit 518 compares phase error amount 571 with data 519 corresponding to the case where the intersymbol-differential-demodulated data is zero, and sends the control signal to the control circuit 520 if it determines that these data are equal to each other. Receiving this control signal, the control circuit 520 supplies control signal c to the RAMs 506 and 506 to make these RAMs store the demodulated signals output from the fast Fourier transform circuit 112. Thereafter, the differential demodulation circuit 503 performs differential demodulation based on the signals stored in the RAMs 506 and 507, so that the phase error signal detection time is longer than the symbol interval time, thereby enabling suitable control detecting a clock frequency error smaller than the residual clock frequency error.

In the above-described embodiment, a clock signal can be accurately reproduced even if an OFDM signal contains a reproducing carrier phase error, an FFT window phase error, a phase error due to Gaussian noise and a phase error due to a multipath transmission channel distortion as well as a phase error due to a clock frequency error.

Figure 6:
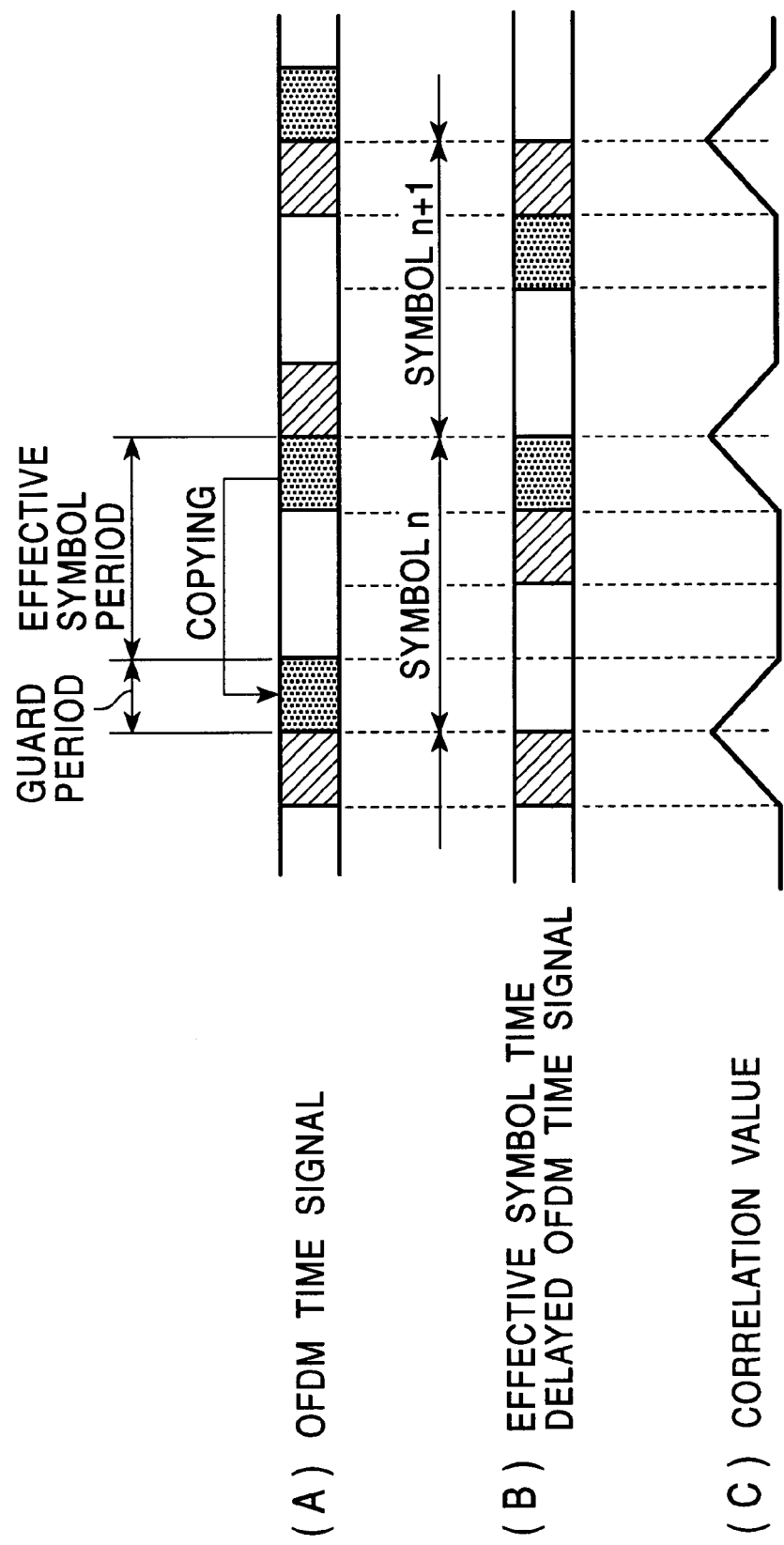
FIG. 6 is a diagram showing an OFDM time signal and a correlation value.

In general, each of symbols of an OFDM time signal has an effective symbol period and a guard period for a copy of a portion of the symbol in the effective symbol period, as shown in (A) of FIG. 6. Therefore, if a correlation value of an OFDM time signal delayed by the effective symbol period (see (B) of FIG. 6) and the original OFDM time signal is calculated over the guard period width, it has a maximum value at the symbol boundaries (see (C) of FIG. 6).

Figure 7:
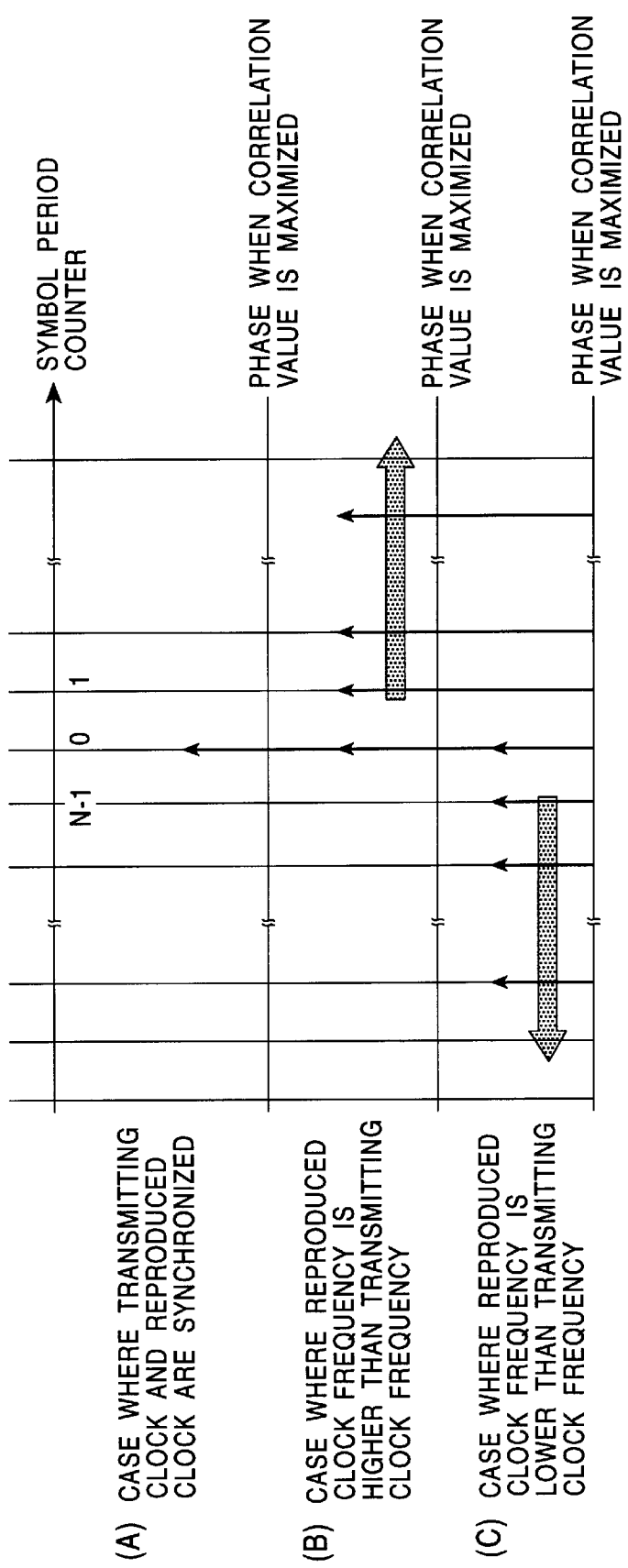
FIG. 7 is a diagram showing the relationship between the phase of a maximum of the correlation value and a clock frequency error.

In the case where the clock signal on the receiving side is not synchronized with that on the transmitting side, the phase with which the correlation value is maximized changes with time, as shown in FIG. 7. That is, as shown in (A) of FIG. 7, the time at which the correlation value becomes maximum is constant when the clock signal on the transmitting side and the clock signal on the receiving side are correctly synchronized. However, if the frequency of the reproducing clock signal is, for example, higher than the transmitting clock signal, the maximization of the correlation value retards gradually. On the other hand, if the frequency of the reproducing clock signal is lower than the transmitting clock signal, the maximization of the correlation value advances gradually. If the clock oscillation circuit 116 is controlled by observing such a phase change, synchronized reproduction of the clock phase can be performed.

Figure 8:
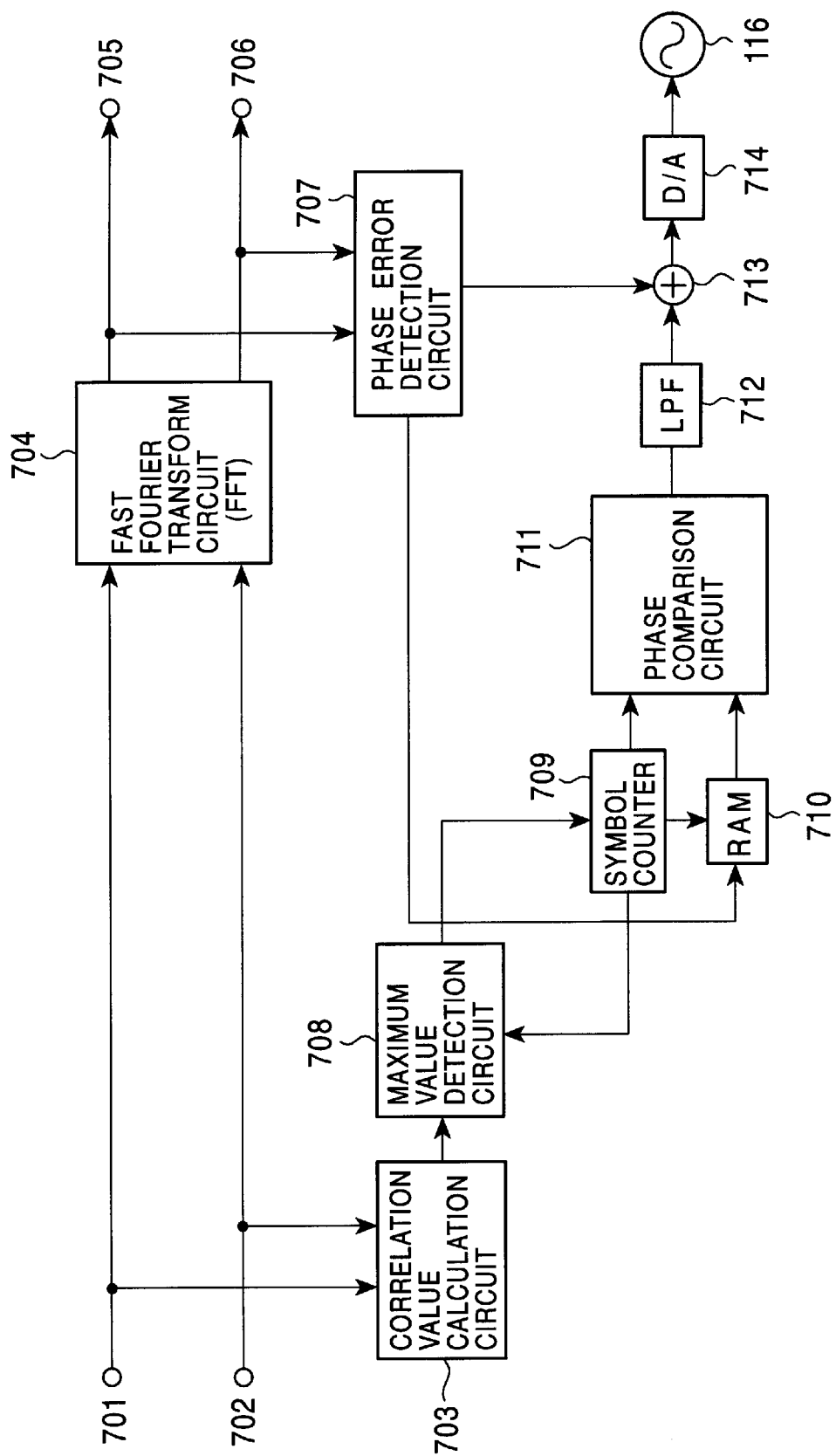
FIG. 8 is a block diagram showing the configuration of a second embodiment of the present invention.

FIG. 8 shows a second embodiment of the present invention based on this principle.

FIG. 8 is a block diagram showing the configuration of a circuit according to a clock reproduction method using a correlation value of an OFDM time signal. In FIG. 8, for ease of explanation, a clock reproduction section is mainly illustrated without a section corresponding to the carrier reproduction section shown in FIG. 10.

I channel components and Q channel components of an OFDM time signal converted into a base band are respectively input to a fast Fourier transform circuit 704 and to a correlation value calculation circuit 703. The correlation value calculation circuit 703 is arranged to calculate a correlation value by using the periodicity of OFDM time signal. The fast Fourier transform circuit 704 is arranged to obtain and output I channel data 705 and Q channel data 706 by performing Fourier transform of the input I channel and Q channel components, and to also supply I channel data 705 and Q channel data 706 to a phase error detection circuit 707. The phase error detection circuit 707 is arranged to detect a phase error by using pilot signals, as described below in detail.

A maximum value detection circuit 708 is arranged to detect a maximum of the correlation value output from the correlation value calculation circuit 703 in synchronization with a symbol counter 709. The symbol counter 709 is arranged to count the symbol time and to supply the count value to the maximum value detection circuit 708. A RAM 710 stores the symbol count value at which the maximum value detection circuit detects the maximum value as a reference phase if a control signal is output from the phase error detection circuit 707, that is, the amount of phase change becomes smaller than the resolution.

A phase comparison circuit 711 is arranged to detect an amount of phase error by comparing the reference phase stored in the RAM 710 and the count value which is supplied from the symbol counter 709 with respect to each symbol and at which the maximum value is detected. An LPF 712 removes noise components from the phase error amount output from the phase comparison circuit 711 and thereafter supplies the phase error amount to an addition circuit 713. The addition circuit 713 calculates the sum of the phase error amount output from the LPF 712 and the phase error amount output from the phase error detection circuit 707, and outputs the calculated sum to a D/A conversion circuit 714. The D/A conversion circuit 714 is arranged to convert phase error amounts output from the addition circuit 713 into a corresponding analog signal, and supplies this signal to a clock oscillation circuit 116. The clock oscillation circuit 116 is arranged to oscillate a clock signal of a predetermined frequency according to the signal output from the D/A conversion circuit 714.

Figure 9:
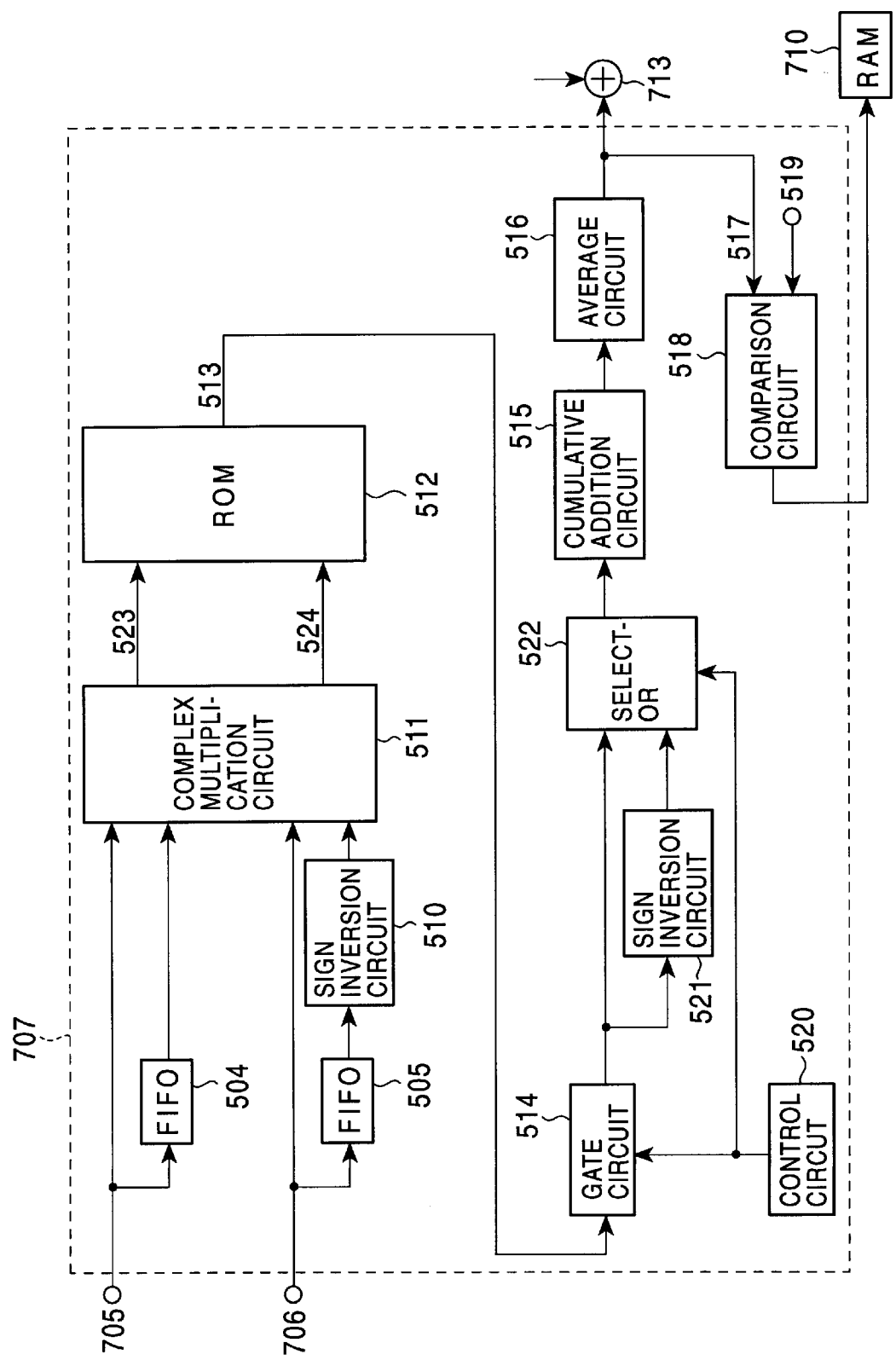
FIG. 9 is a block diagram showing the configuration of a phase error detection circuit shown in FIG. 8.

The configuration of an example of the phase error detection circuit 707 shown in FIG. 8 will next be described in detail with reference to FIG. 9. The phase error detection circuit 707 is formed by removing the phase storage section from the arrangement of the embodiment shown in FIG. 1. In FIG. 9, sections corresponding to those in FIG. 1 are indicated by the corresponding reference numerals. The description for the corresponding sections will not be repeated.

In this embodiment, the output of the comparison circuit 518 is input to a RAM 710. In other respects, the configuration of this embodiment is the same as that shown in FIG. 1.

The operation of this embodiment will next be described with reference to FIGS. 8 and 9.

At an initial stage of the clock reproducing operation, intersymbol differential demodulation of signals processed by FFT processing is performed to obtain a phase error of each subcarrier, as described above with respect to the first embodiment. From the phase error signal thereby obtained, pilot signals are extracted. A clock frequency error is detected by cumulative addition of the extracted pilot signals, and a clock signal is reproduced by referring to the detected frequency error.

When clock signal reproduction performed by the phase error detection circuit 707 is completed, the error value becomes smaller than the resolution and falls into the residual clock frequency error region shown in FIG. 4. At this time, the comparison circuit 518 compares phase error amount 517 with data 519 corresponding to the case where intersymbol-differential-modulated data is zero, and sends a control signal to the RAM 710 if these data are equal to each other. Receiving the control signal, the RAM 710 receives, from the symbol counter 709, the symbol phase corresponding to the maximum value detected by the maximum value detection circuit 708 at the corresponding time, and stores the received symbol phase as a reference phase.

Thereafter, the phase comparison circuit 711 compares the reference phase stored in the RAM 710 and the maximum value detection phase supplied from the symbol counter 709 corresponding to each symbol to detect an amount of phase error. The LPF 712 removes noise components from the phase error amount output from the phase comparison circuit 711 and outputs the phase error amount to the addition circuit 713. The addition circuit 713 calculates the sum of the output from the phase error detection circuit 707 and the LPF 712 and supplies the calculated sum to the D/A converter circuit 714.

The D/A converter circuit 714 converts the output signal (digital signal) from the addition circuit 713 into a corresponding analog signal and outputs this signal to the clock oscillation circuit 116. The clock oscillation circuit 116 oscillates at the frequency according to the output from the D/A converter 714 to output the clock signal.

In the above-described embodiment, the frequency of the clock signal is determined by high-speed control of the phase error detection circuit 707 at an initial stage of the clock reproducing operation and, when the frequency error of the clock becomes smaller than the detection resolution of the phase error detection circuit 707, the correlation value of the OFDM time signal is used to perform accurate frequency control.

In the receiving apparatus according to the first aspect of the present invention and in the receiving method according to the second aspect of the present invention, an OFDM signal is processed by discrete Fourier transform; a subcarrier frequency component thereby obtained is stored; an amount of phase change between a frequency component stored at least one symbol before and a frequency component newly obtained is calculated; a component corresponding to a series of pilot signals is extracted from the calculated phase change amount; and the frequency of a clock signal is controlled according to the extracted phase change amount corresponding to the series of pilot signals. Therefore, it is possible to accurately form the clock signal even if the received OFDM signal contains, as well as a phase error accompanying a clock frequency error, a reproducing carrier phase error, an FFT window phase error, a phase error due to Gaussian noise, and a phase error due to multipath transmission channel distortion.

In the receiving apparatus according to the third aspect of the present invention and in the receiving method according to the fourth aspect of the present invention, an OFDM time signal converted into a baseband is delayed by an effective symbol period; a value representing a correlation between the delayed OFDM time signal and the undelayed OFDM time signal is calculated; a maximum of the obtained correlation value is detected; a phase of a maximum detected at a certain time is held; a phase shift between the held phase and the phase of a maximum newly detected is calculated; and the frequency of a clock signal is controlled according to the calculated phase shift, thereby enabling the clock signal to be accurately formed.

What is claimed is:

1. An apparatus for receiving an Orthoganol Frequency Division Multiplexing signal, comprising:

a conversion circuit adapted to perform a discrete Fourier transform of the OFDM signal;

a storage circuit adapted to store a frequency component of a subcarrier obtained by said conversion circuit;

a computation circuit adapted to compute an amount of phase change between the frequency component stored in said storage circuit at least one symbol before and a frequency component newly obtained by said conversion circuit;

an extraction circuit adapted to extract a component corresponding to a series of pilot signals from the amount of phase change computed by said computation circuit; and a control circuit adapted to control the frequency of a clock signal according to the amount of phase change extracted by said extraction circuit and corresponding to the series of pilot signals.

2. An apparatus according to claim 1, further comprising a cumulative addition circuit adapted to perform, over a predetermined period, cumulative addition of phase change amounts extracted by said extraction means and corresponding to the series of pilot signals, wherein said control circuit controls the frequency of the clock signal according to a value obtained by said cumulative addition circuit.

3. An apparatus according to claim 1, further comprising:

a detection circuit adapted to detect a decrease of the phase change amount extracted by said extraction circuit and corresponding to the series of pilot signals below a predetermined value; and an inhibition circuit adapted to detect a change of the subcarrier frequency component stored in said storage circuit if decrease of the phase change amount below the predetermined value is detected by said detection circuit.

4. An apparatus according to claim 1, further comprising:

a delay circuit adapted to delay, by an effective symbol period, the OFDM time signal converted into a base band;

a calculation circuit adapted to calculate a value representing a correlation between the OFDM time signal delayed by said delay circuit and the undelayed OFDM time signal;

a detection circuit adapted to detect a maximum value of an output from said calculation circuit;

a hold circuit adapted to hold a phase of a maximum value at a certain time detected by said detection circuit; and an estimation circuit adapted to estimate a phase shift between the phase held by said hold circuit and the phase of a maximum value newly detected by said detection means, wherein said control circuit controls the frequency of the clock signal according to the phase shift estimated by said estimation circuit and the phase change amount extracted by said extraction circuit and corresponding to the series of pilot signals.

5. A method of receiving an Orthoganol Frequency Division Multiplexing signal, comprising:

a conversion step of performing discrete Fourier transform of the OFDM signal;

a storage step of storing a frequency component of a subcarrier obtained in said conversion step;

a computation step of computing an amount of phase change between the frequency component stored in said storage step at least one symbol before and a frequency component newly obtained in said conversion step;

an extraction step of extracting a component corresponding to a series of pilot signals from the amount of phase change computed in said computation step; and a control step of controlling the frequency of a clock signal according to the amount of phase change extracted in said extraction step and corresponding to the series of pilot signals.

6. An apparatus for receiving an Orthoganol Frequency Division Multiplexing signal, comprising:

delay means for delaying, by an effective symbol period, the OFDM time signal converted into a base band;

calculation means for calculating a value representing a correlation between the OFDM time signal delayed by said delay means and the undelayed OFDM time signal;

detection means for detecting a maximum of the correlation value obtained by said calculation means;

hold means for holding a phase of a maximum at a certain time detected by said detection means;

estimation means for estimating a phase shift between the phase held by said hold means and the phase of a maximum newly detected by said detection means; and control means for controlling the frequency of a clock signal according to the phase shift estimated by said estimation means.

7. A method of receiving an Orthoganol Frequency Division Multiplexing signal, comprising:

a delay step of delaying, by an effective symbol period, the OFDM time signal converted into a base band;

a calculation step of calculating a value representing a correlation between the OFDM time signal delayed in said delay step and the undelayed OFDM time signal;

a detection step of detecting a maximum of the correlation value obtained in said calculation step;

a hold step of holding a phase of a maximum at a certain time detected in said detection step;

an estimation step of estimating a phase shift between the phase held in said hold step and the phase of a maximum newly detected in said detection step; and a control step of controlling the frequency of a clock signal according to the phase shift estimated in said estimation step.

8. An apparatus for receiving an Orthoganol Frequency Division Multiplexing signal, comprising:

conversion means for performing discrete Fourier transform of the OFDM signal;

storage means for storing a frequency component of a subcarrier obtained by said conversion means;

computation means for computing an amount of phase change between the frequency component stored in said storage means at least one symbol before and a frequency component newly obtained by said conversion means;

extraction means for extracting a component corresponding to a series of pilot signals from the amount of phase change computed by said computation means; and control means for controlling the frequency of a clock signal according to the amount of phase change extracted by said extraction means and corresponding to the series of pilot signals;

delay means for delaying, by an effective symbol period, the OFDM time signal converted into a base band;

calculation means for calculating a value representing a correlation between the OFDM time signal delayed by said delay means and the undelayed OFDM time signal;

detection means for detecting a maximum value of an output from said calculation means;

hold means for holding a phase of a maximum value at a certain time detected by said detection means; and estimation means for estimating a phase shift between the phase held by said hold means and the phase of a maximum value newly detected by said detection means, wherein said control means controls the frequency of the clock signal according to the phase shift estimated by said estimation means and the phase change amount extracted by said extraction means and corresponding to the series of pilot signals.

9. An apparatus for receiving an Orthoganol Frequency Division Multiplexing signal, comprising:

a delay circuit adapted to delay, by an effective symbol period, the Orthoganol Frequency Division Multiplexing time signal converted into a base band;

a calculation circuit adapted to calculate a value representing a correlation between the Orthoganol Frequency Division Multiplexing time signal delayed by said delay circuit and the undelayed Orthoganol Frequency Division Multiplexing time signal;

a detection circuit adapted to detect a maximum of the correlation value obtained by said calculation circuit;

a hold circuit adapted to hold a phase of a maximum at a certain time detected by said detection circuit;

an estimation circuit adapted to estimate a phase shift between the phase held by said hold circuit and the phase of a maximum newly detected by said detection circuit; and a control circuit adapted to control the frequency of a clock signal according to the phase shift estimated by said estimation circuit.

* * * * *

UNITED STATES PATENT AND TRADEMARK OFFICE
CERTIFICATE OF CORRECTION

PATENT NO. : 6,215,819 B1
DATED : April 10, 2001
INVENTOR(S) : Hiyakudai et al.

It is certified that error appears in the above-identified patent and that said Letters Patent is hereby corrected as shown below:

Column 1,
Lines 12, 13, "orthogonal frequency division multiplexing" should read -- Orthogonal Frequency Division Multiplexing --.
Line 18, "phase shift keying" should read -- Phase Shift Keying --.
Line 19, "quadrature amplitude modulaton" should read -- Quadrature Amplitude Modulaton --.

Column 3,
Line 12, after signals insert -- ) --

Column 8,
Line 49, "value" should read -- values --.

Column 11,
Line 31, "506" should read -- 507 --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*